US012736822B2

(12) United States Patent
Yang et al.

(10) Patent No.: US 12,736,822 B2
(45) Date of Patent: Sep. 15, 2026

(54) HEAD MOUNTED DISPLAY

(71) Applicant: HTC Corporation, Taoyuan City (TW)

(72) Inventors: Chun-Kai Yang, Taoyuan City (TW); Ying-Chieh Huang, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 249 days.

(21) Appl. No.: 18/635,009

(22) Filed: Apr. 15, 2024

(65) Prior Publication Data

US 2025/0147321 A1 May 8, 2025

Related U.S. Application Data

(60) Provisional application No. 63/595,341, filed on Nov. 2, 2023.

(51) Int. Cl.
*G02B 27/01* (2006.01)
*G02B 7/12* (2021.01)

(52) U.S. Cl.
CPC ..... *G02B 27/0176* (2013.01); *G02B 27/0172* (2013.01); *G02B 7/12* (2013.01); *G02B 2027/0132* (2013.01); *G02B 2027/0156* (2013.01); *G02B 2027/0163* (2013.01)

(58) Field of Classification Search
CPC .................. G02B 7/12; G02B 27/0176; G02B 2027/0132; G02B 2027/0154; G02B 2027/0159; G02B 2027/0161; G02B 2027/0163; G02B 2027/0181
See application file for complete search history.

(56) References Cited

U.S. PATENT DOCUMENTS 11,347,307 B1 5/2022 Knoppert et al.
11,835,725 B2 * 12/2023 Chang ................ G02B 27/0172
2018/0338130 A1 * 11/2018 Miller .................. H04N 13/327
(Continued)

FOREIGN PATENT DOCUMENTS

CN 113589531 A * 11/2021 ......... G02B 27/0176
CN 113608351 A * 11/2021 ......... G02B 27/0176
(Continued)

OTHER PUBLICATIONS

English machine translation of CN 113589531 A (Year: 2021).*
English machine translation of TW 1697695 B (Year: 2020).*

*Primary Examiner* — Nicholas R. Pasko
(74) *Attorney, Agent, or Firm* — JCIPRNET

(57) ABSTRACT

A head mounted display including a first display, a second display, a transmission component, an electrically controlled driver and a manual adjustment component is provided. The transmission component is connected to the first display and the second display. The electrically controlled driver is coupled to the transmission component. The electrically controlled driver drives the transmission component in an electrically controlled mode to adjust a distance between the first display and the second display. The manual adjustment component is detachably coupled to the transmission component. The manual adjustment component is coupled to and drives the transmission component to adjust the distance between the first display and the second display in a manual mode, and the manual adjustment component is separated from the transmission component in the electronic control mode.

7 Claims, 10 Drawing Sheets

(56) References Cited

U.S. PATENT DOCUMENTS

| | | | | |
|---|---|---|---|---|
| 2019/0129181 | A1 | 5/2019 | Polcak et al. | |
| 2020/0310137 | A1* | 10/2020 | Lan ...................... | F16M 11/043 |
| 2020/0355928 | A1 | 11/2020 | Dai | |
| 2024/0012257 | A1* | 1/2024 | Wang ................. | G02B 27/0176 |
| 2024/0241385 | A1* | 7/2024 | Pier .................... | G02B 27/0176 |

FOREIGN PATENT DOCUMENTS

| | | | | | |
|---|---|---|---|---|---|
| CN | 116184675 | A | * | 5/2023 | ......... G02B 27/0176 |
| TW | 201812385 | | | 4/2018 | |
| TW | I697695 | B | * | 7/2020 | |
| TW | I697695 | | | 7/2020 | |
| TW | 202127100 | | | 7/2021 | |
| WO | WO-2017193218 | A1 | * | 11/2017 | ........... G02B 27/017 |
| WO | WO-2023005793 | A1 | * | 2/2023 | ......... G02B 27/0176 |

* cited by examiner 100
110
122
120
112A2
112A1
112A
136A
112
130
136
134
54B
54

100
110
122
120
112A2
112A1
112A
136A
112
136
130
134
54B
54

HEAD MOUNTED DISPLAY

CROSS-REFERENCE TO RELATED APPLICATION

This application claims the priority benefit of U.S. provisional application Ser. No. 63/595,341, filed on Nov. 2, 2023. The entirety of the above-mentioned patent application is hereby incorporated by reference herein and made a part of this specification.

BACKGROUND

Technical Field

This application relates to a display device, and in particular to a head mounted display.

Description of Related Art

With the increasing development of the technology industry, there are many types of head mounted displays, such as eye masks and other head mounted displays. For example, when a user wears this type of display, in addition to seeing three-dimensional images, the image also changes as the user's head turns, providing a more immersive experience for the user. It can also be used in the Mixed Reality (MR) field.

However, the pupillary distance varies from user to user. In order to make the same head mounted display provide the same better experience for different users, some head mounted displays are now equipped with the function of interpupillary distance (IPD) adjustment. For example, the function of interpupillary distance adjustment can be achieved by electronic control to automatically adjust the interpupillary distance, but some users still have the need to manually adjust the interpupillary distance.

SUMMARY

This application provides a head mounted display to provide functions of automatically adjusting an interpupillary distance and manually adjusting the interpupillary distance. The head mounted display in this application includes a first display, a second display, a transmission component, an electrically controlled driver, and a manual adjustment component. The transmission component connects the first display and the second display. The electrically controlled driver is coupled to the transmission component. The electrically controlled driver drives the transmission component in an electronic control mode to adjust a distance between the first display and the second display. The manual adjustment component is detachably coupled to the transmission component. The manual adjustment component is coupled to and drives the transmission component in a manual mode to adjust the distance between the first display and the second display, and the manual adjustment component is separated from the transmission component in the electronic control mode.

Based on the above, in the head mounted display of this application, the manual adjustment component is separated from the transmission component in the electronic control mode. Therefore, the head mounted display of this application provides the function of automatically adjusting the interpupillary distance and manually adjusting the interpupillary distance. In addition, the separation of the manual adjustment component and the transmission component in the electronic control mode prevents the manual adjustment component from affecting the adjustment of the interpupillary distance in the electronic control mode. When the user is not satisfied with the automatically adjusted interpupillary distance in the electronic control mode, the user can also use the manual adjustment component to fine-tune the interpupillary distance.

DESCRIPTION OF THE EMBODIMENTS

Figure 1:
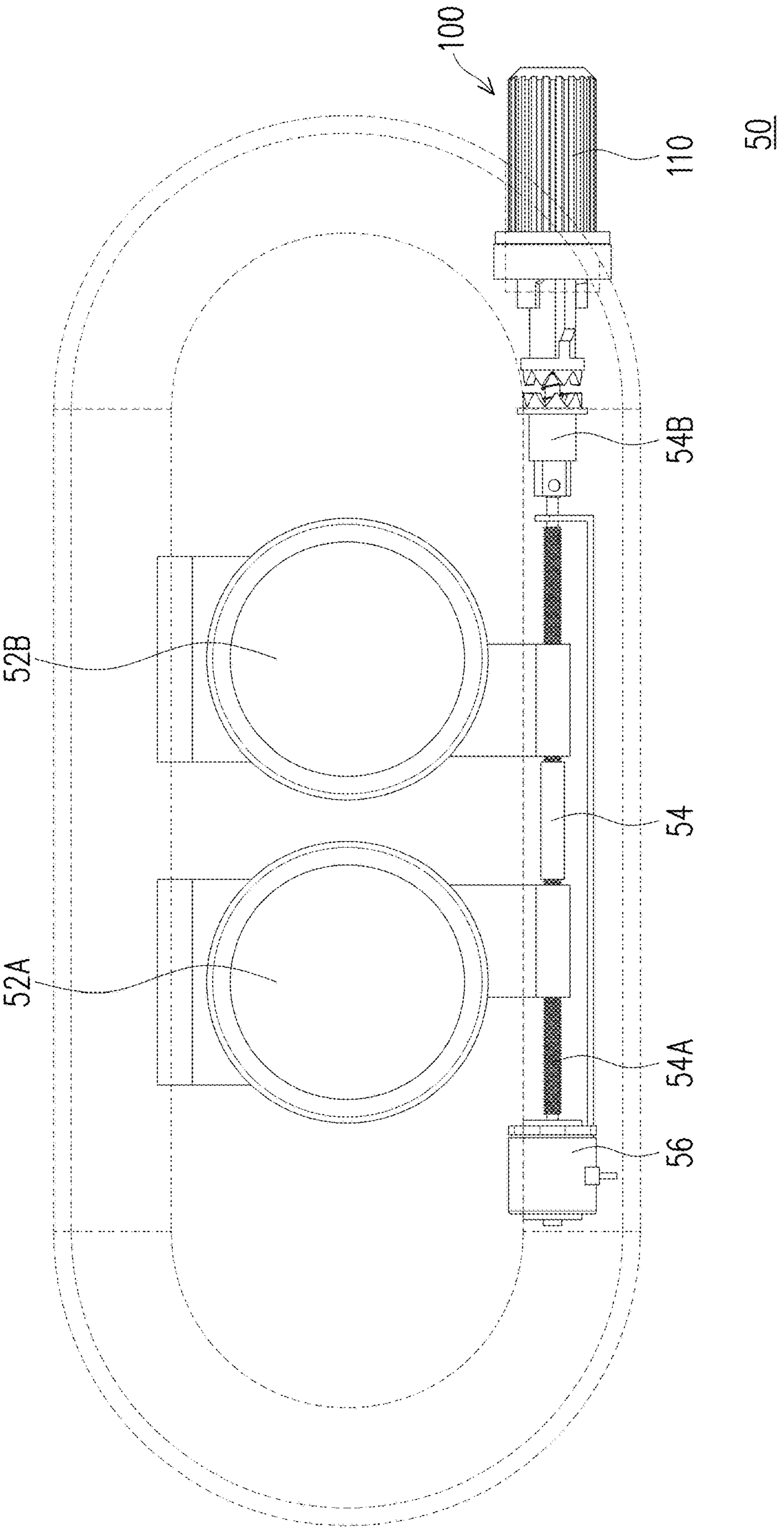
FIG. 1 is a schematic diagram of a head mounted display according to a first embodiment of the invention.
Figure 2:
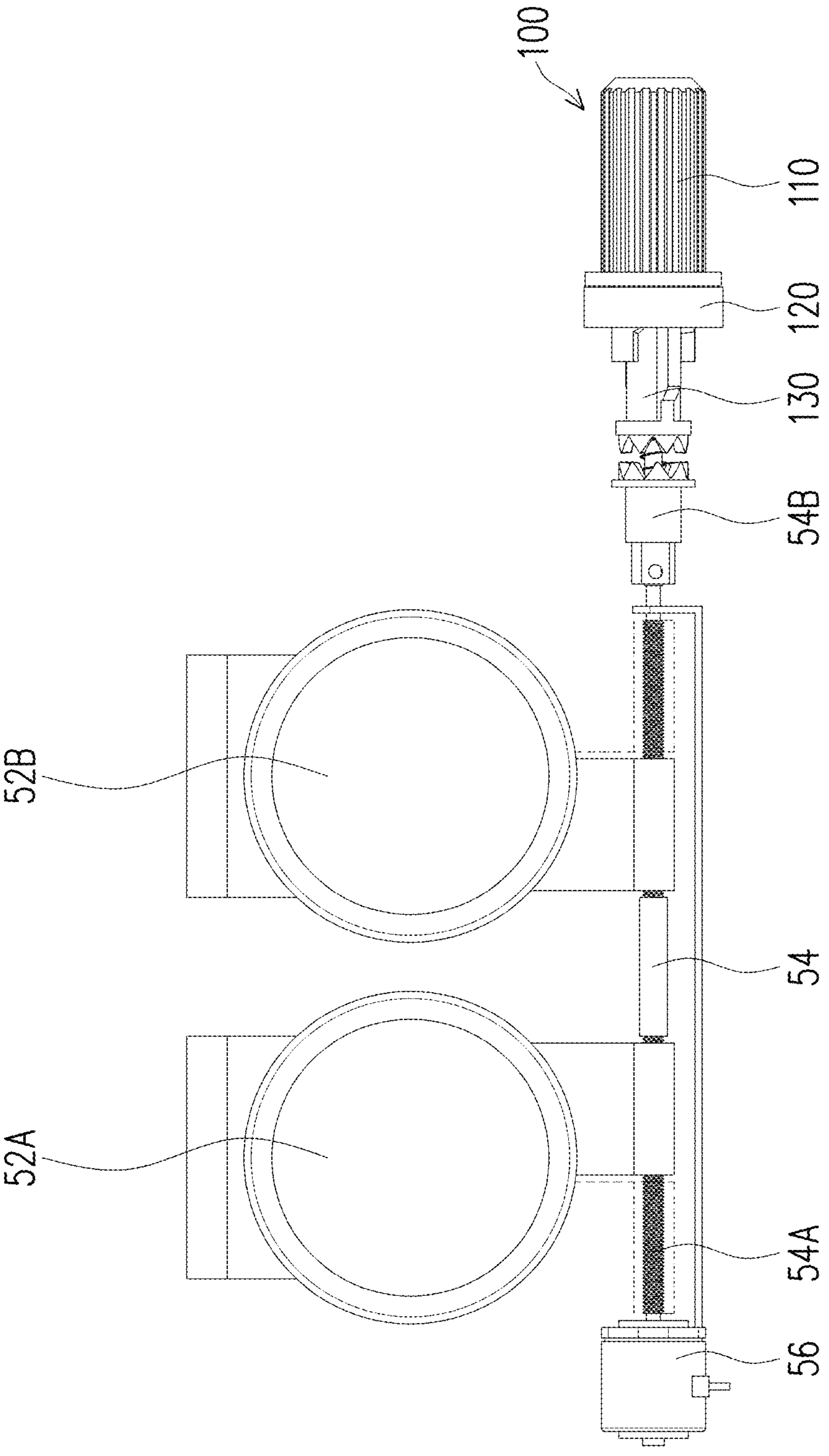
FIG. 2 is a schematic diagram of an electronic control mode of the head mounted display in FIG. 1 after removing a casing.
Figure 3:
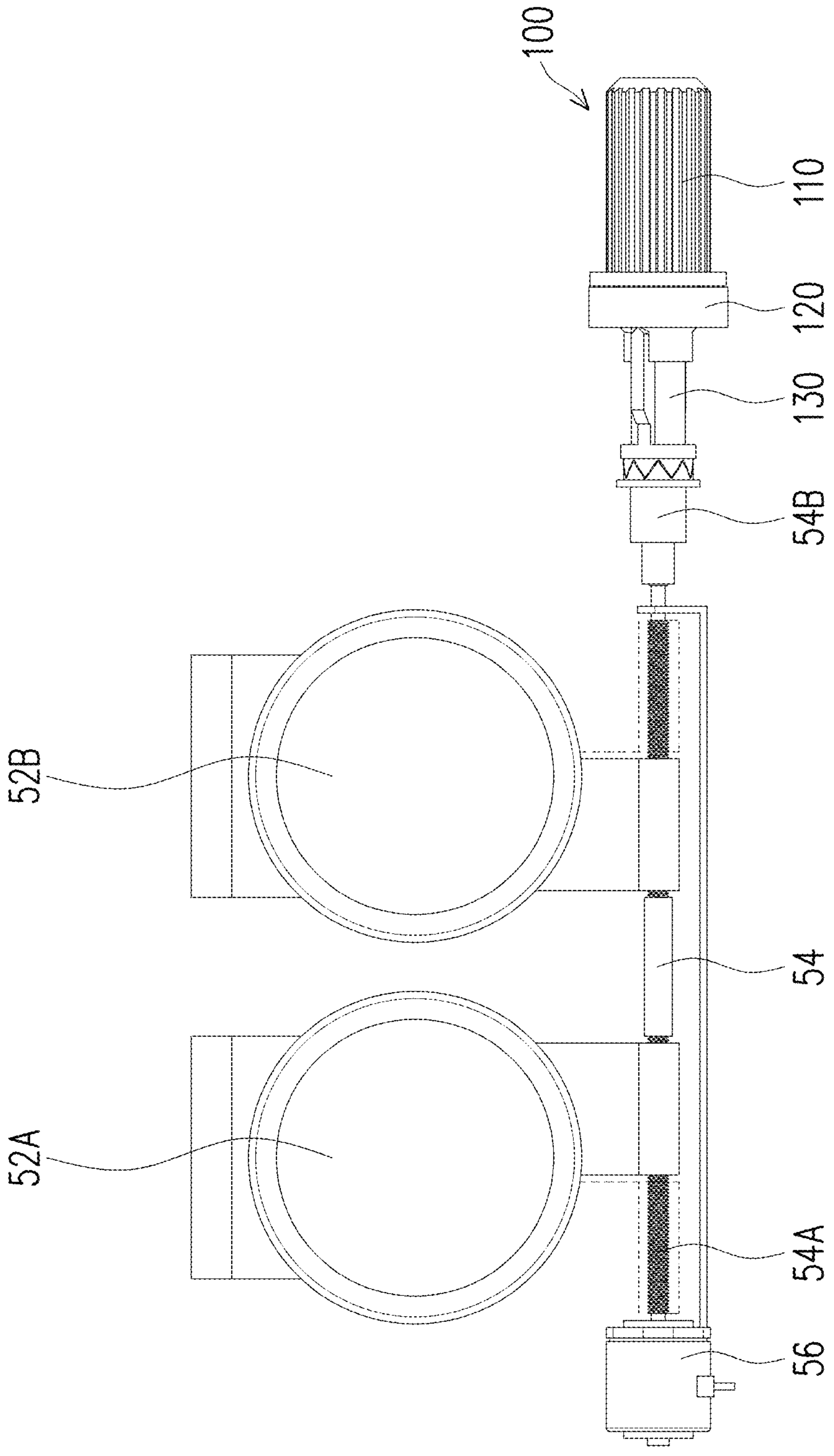
FIG. 3 is a schematic diagram of a manual mode of the head mounted display in FIG. 1 after removing the casing.

FIG. 1 is a schematic diagram of a head mounted display according to a first embodiment of the invention. FIG. 2 is a schematic diagram of an electronic control mode of the head mounted display in FIG. 1 after removing a casing. FIG. 3 is a schematic diagram of a manual mode of the head mounted display in FIG. 1 after removing the casing. Referring to FIG. 1 to FIG. 3, a head mounted display 50 of this embodiment includes a first display 52A, a second display 52B, a transmission component 54, an electrically controlled driver 56, and a manual adjustment component 100. For example, the first display 52A and the second display 52B include a display panel and an optical system respectively. The optical system is, for example, a lens group, so the image displayed on the display panel can be projected to eyes of a user through the lens group.

The transmission component 54 connects the first display 52A and the second display 52B. For example, the transmission component 54 of this embodiment is screw-connected to the first display 52A and the second display 52B. That is, the transmission component 54 uses a threaded portion to connect a threaded portion of the first display 52A and a threaded portion of the second display 52B. In this embodiment, for example, when the transmission component 54 rotates in one direction, threads of the transmission component 54 drives the first display 52A and the second display 52B to move toward each other, so that a distance between them is shortened. On the other hand, when the transmission component 54 rotates in the opposite direction, the threads of the transmission component 54 drives the first display 52A and the second display 52B to move away from each other, so that the distance between them increases.

The electrically controlled driver 56 is coupled to the transmission component 54. That is, the electrically controlled driver 56 may drive the transmission component 54 to move, for example, rotate. The electrically controlled driver 56 drives the transmission component 54 in an electronic control mode to adjust the distance between the first display 52A and the second display 52B. For example, in the electronic control mode, the user can send a control signal to the electrically controlled driver 56 through an operation interface of the head mounted display 50, and the electrically controlled driver 56 drives the transmission component 54 in an electronic control mode to adjust the distance between the first display 52A and the second display 52B. Or, in the electronic control mode, the head mounted display 50 can use a sensor to detect an interpupillary distance of the current user, and send a corresponding control signal to the electrically controlled driver 56. The electrically controlled driver 56 drives the transmission component 54 in an electronic control mode to adjust the distance between the first display 52A and the second display 52B. For example, the electrically controlled driver 56 of this embodiment may be a motor.

The manual adjustment component 100 is detachably coupled to the transmission component 54. The manual adjustment component 100 is coupled to and drives the transmission component 54 in a manual mode to adjust the distance between the first display 52A and the second display 52B, and the manual adjustment component 100 is separated from the transmission component 54 in the electronic control mode. In other words, in the electronic control mode, because the manual adjustment component 100 is separated from the transmission component 54, the transmission component 54 does not drive the manual adjustment component 100, and even if the manual adjusting component 100 is rotated or fixed by an external force, the movement of the transmission component 54 is not affected, which ensures that the electronically controlled driver 56 can accurately adjust the distance between the first display 52A and the second display 52B. In other words, in the electronic control mode, since the manual adjustment component 100 is separated from the transmission component 54, the rotation of the transmission component 54 does not drive the rotation of the manual adjustment component 100.

Figure 4:
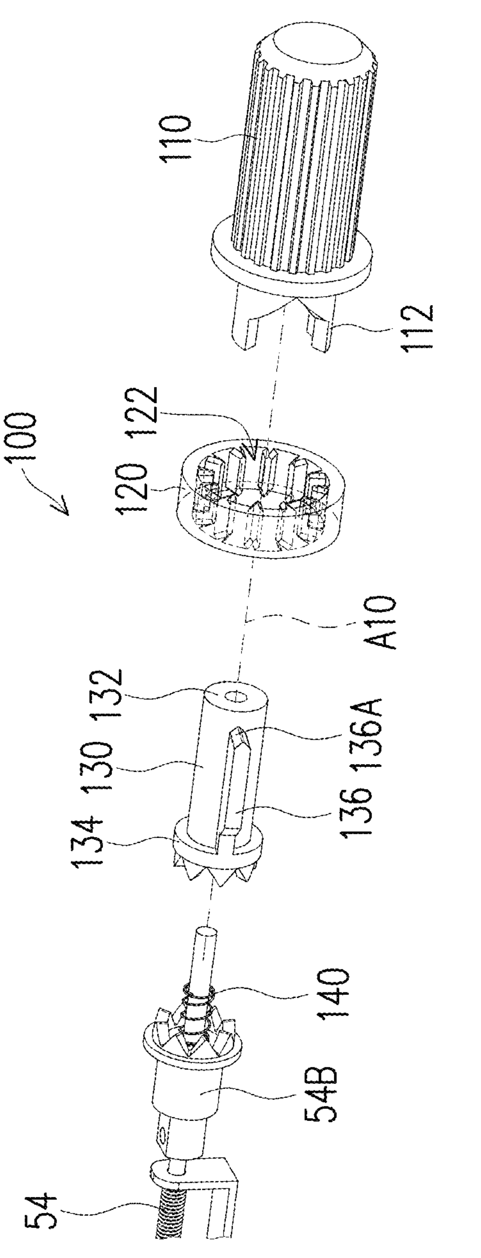
FIG. 4 is an exploded diagram of a manual adjustment component and a transmission component of the head mounted display in FIG. 1.

FIG. 4 is an exploded diagram of a manual adjustment component and a transmission component of the head mounted display in FIG. 1. Referring to FIG. 4, the transmission component 54 of this embodiment has a fixed connection end 54A and a first coupling end 54B opposite to each other. The fixed connection end 54A is fixedly connected to the electrically controlled driver 56. The first coupling end 54B is detachably coupled to the manual adjustment component 100.

The manual adjustment component 100 of this embodiment includes a knob 110, a guide ring 120, a sliding component 130, and a reset component 140. The knob 110 is adapted to rotate in a rotation axis direction A10. A driving section 112 of the knob 110 is pivoted in the guide ring 120. That is, the knob 110 may rotate relative to the guide ring 120, while the guide ring 120 is not rotating relative to the entire head mounted display 50, and neither the guide ring 120 nor the knob 110 moves in the rotation axis direction A10 relative to the entire head mounted display 50.

Figure 5:
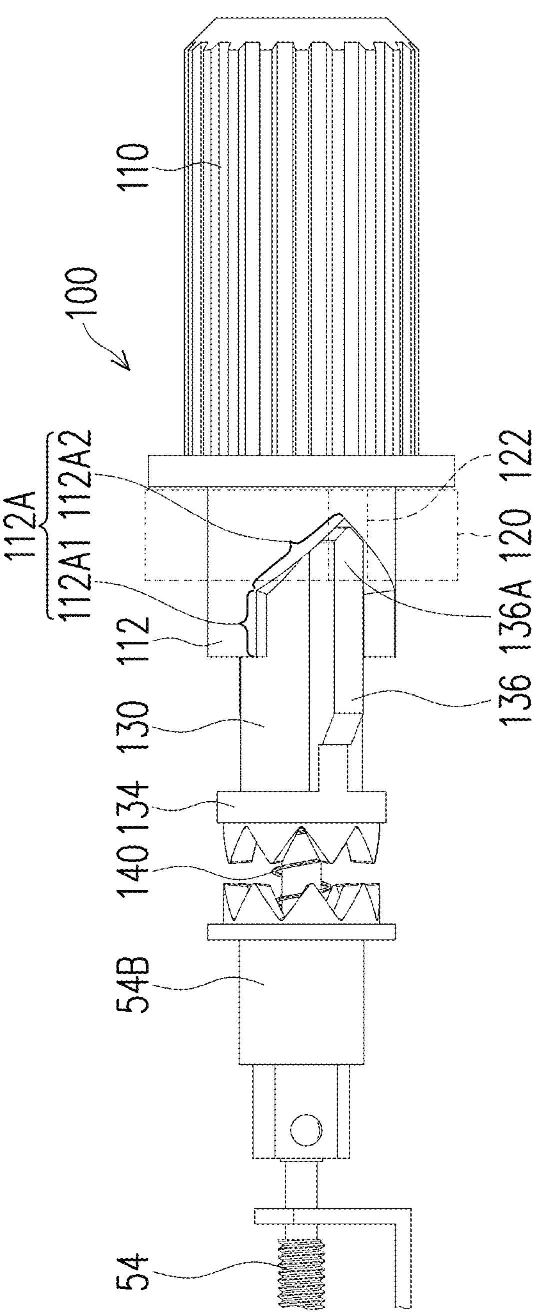
FIG. 5 to FIG. 7 are action diagrams of the manual adjustment component and the transmission component of the head mounted display in FIG. 1 switched from the electronic control mode to the manual mode.
Figure 6:
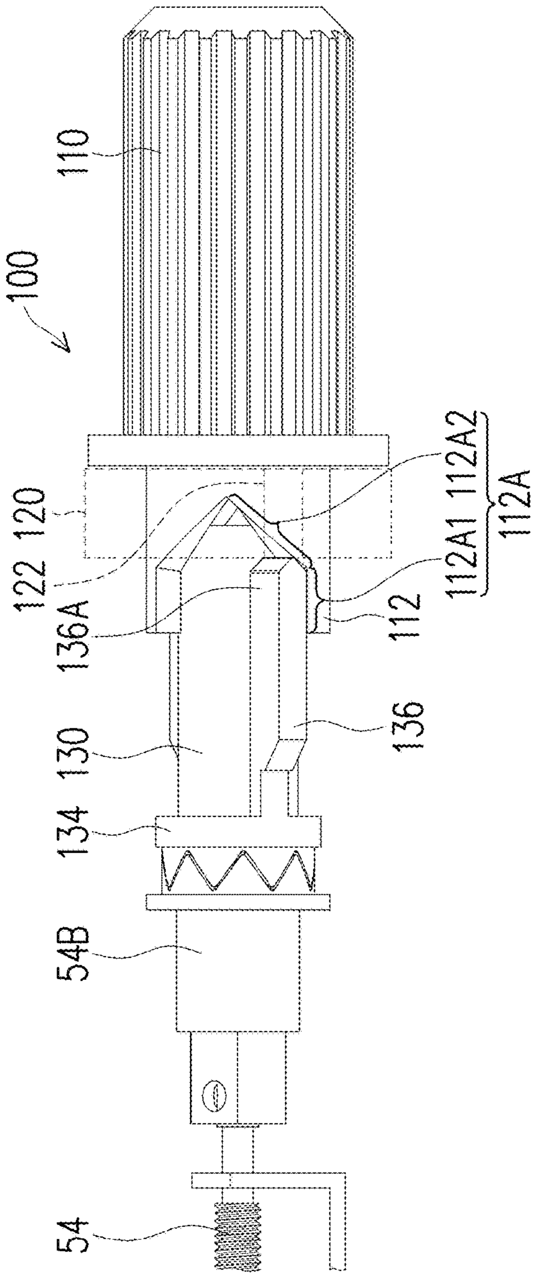
Figure 7:
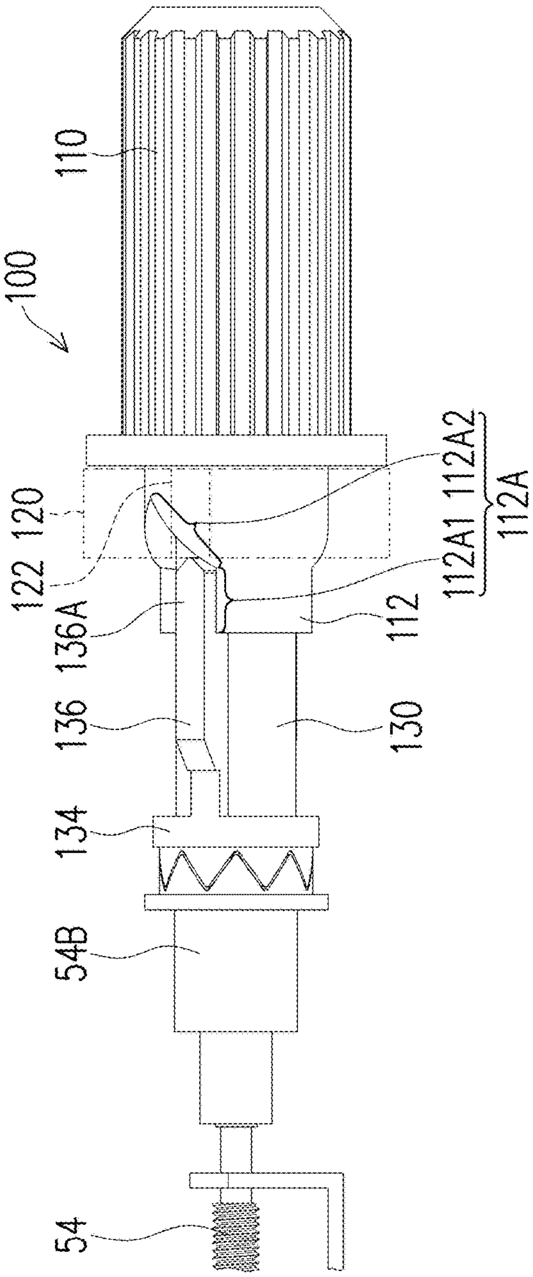

FIG. 5 to FIG. 7 are action diagrams of the manual adjustment component and the transmission component of the head mounted display in FIG. 1 switched from the electronic control mode to the manual mode. Referring to FIG. 4 and FIG. 5, the driving section 112 has a chute 112A. The chute 112A has a ramp section 112A2 and a parallel section 112A1. The ramp section 112A2 is further away from the first coupling end 54B of the transmission component 54 than the parallel section 112A1. A wall surface of the ramp section 112A2 is not parallel to the rotation axis direction A10 of the knob 110. A wall surface of the parallel section 112A 1 is parallel to the rotation axis direction A10. An inner surface of the guide ring 120 has multiple guide slots 122. In order to simplify the illustration for clear understanding, FIG. 5 to FIG. 7 only show the location of one guide slot 122. The sliding component 130 has a pivot end 132 and a second coupling end 134 opposite to each other. The pivot end 132 is pivoted in the driving section 112. That is, the sliding component 130 and the knob 110 may rotate relative to each other. An outer surface of the sliding component 130 has a guide rib 136.

In the electronic control mode as shown in FIG. 5, a front section 136A of the guide rib 136 is slidably disposed in one of the guide slots 122, so that the sliding component 130 cannot rotate relative to the guide ring 120, but can only move relative to the guide ring 120 in the rotation axis direction A10. At the same time, resilient restoring force of the reset component 140 pushes against the sliding component 130, so that the front section 136A remains in contact with the wall surface of the ramp section 112A2. In addition, the first coupling end 54B is away from the second coupling end 134. Thus, the transmission component 54 and the sliding component 130 do not interfere with each other. At this time, the electrically controlled driver 56 may accurately adjust the distance between the first display 52A and the second display 52B without being interfered by the knob 110.

During the process of switching from the electronic control mode to the manual mode as shown in FIG. 6, the front section 136A of the guide rib 136 of the sliding component 130 is still located in one of the guide slots 122. When the knob 110 rotates relative to the guide ring 120, the ramp section 112A2 pushes the guide rib 136. Since the guide ring 120 restricts the rotation of the sliding component 130, the thrust force exerted on the guide rib 136 by the ramp section 112A2 only causes the sliding component 130 to move in the rotation axis direction A10 and causes the guide rib 136 to slide in a direction of moving out of the guide slot 122.

In the manual mode as shown in FIG. 7, the knob 110 continues to rotate relative to the guide ring 120, and the guide rib 136 is already located outside the guide slot 122. At this time, the front section 136A of the guide rib 136 has left the ramp section 112A2, and the front section 136A of the guide rib 136 contacts the wall surface of the parallel section 112A1, and the first coupling end 54B is coupled to the second coupling end 134. Thus, the guide ring 120 no longer restricts the rotation of the sliding component 130, and the ramp section 112A2 no longer pushes the guide rib 136 to move in the rotation axis direction A10. On the other hand, the rotation of the knob 110 may be transmitted to the front section 136A of the guide rib 136 through the wall surface of the parallel section 112A1, driving the sliding component 130 to rotate. At the same time, the second coupling end 134 of the sliding component 130 is coupled to the first coupling end 54B of the transmission component 54, so that the sliding component 130 may drive the transmission component 54 to rotate to manually adjust the distance between the first display 52A and the second display 52B.

Figure 8:
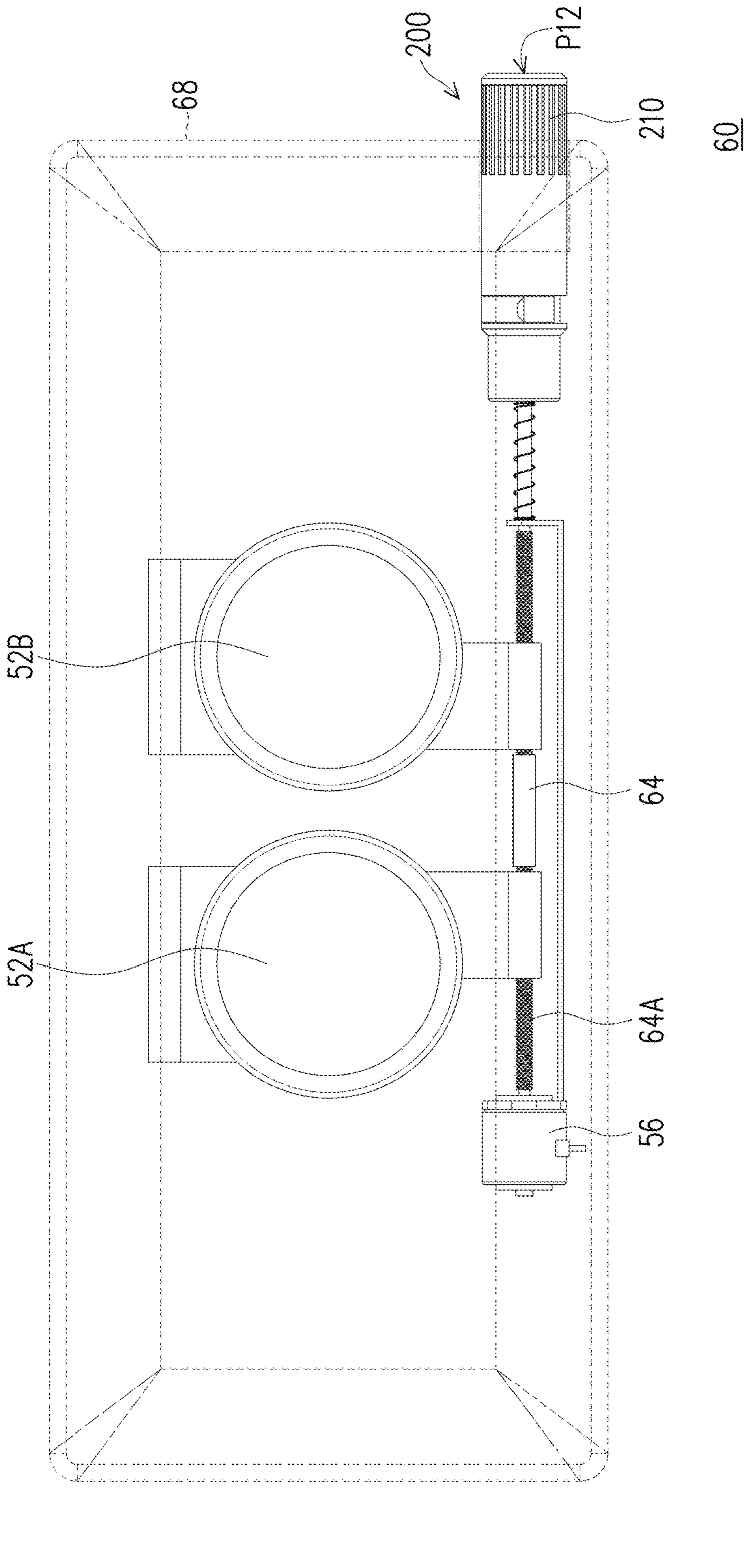
FIG. 8 is a schematic diagram of a manual mode of a head mounted display according to a second embodiment of the invention.
Figure 9:
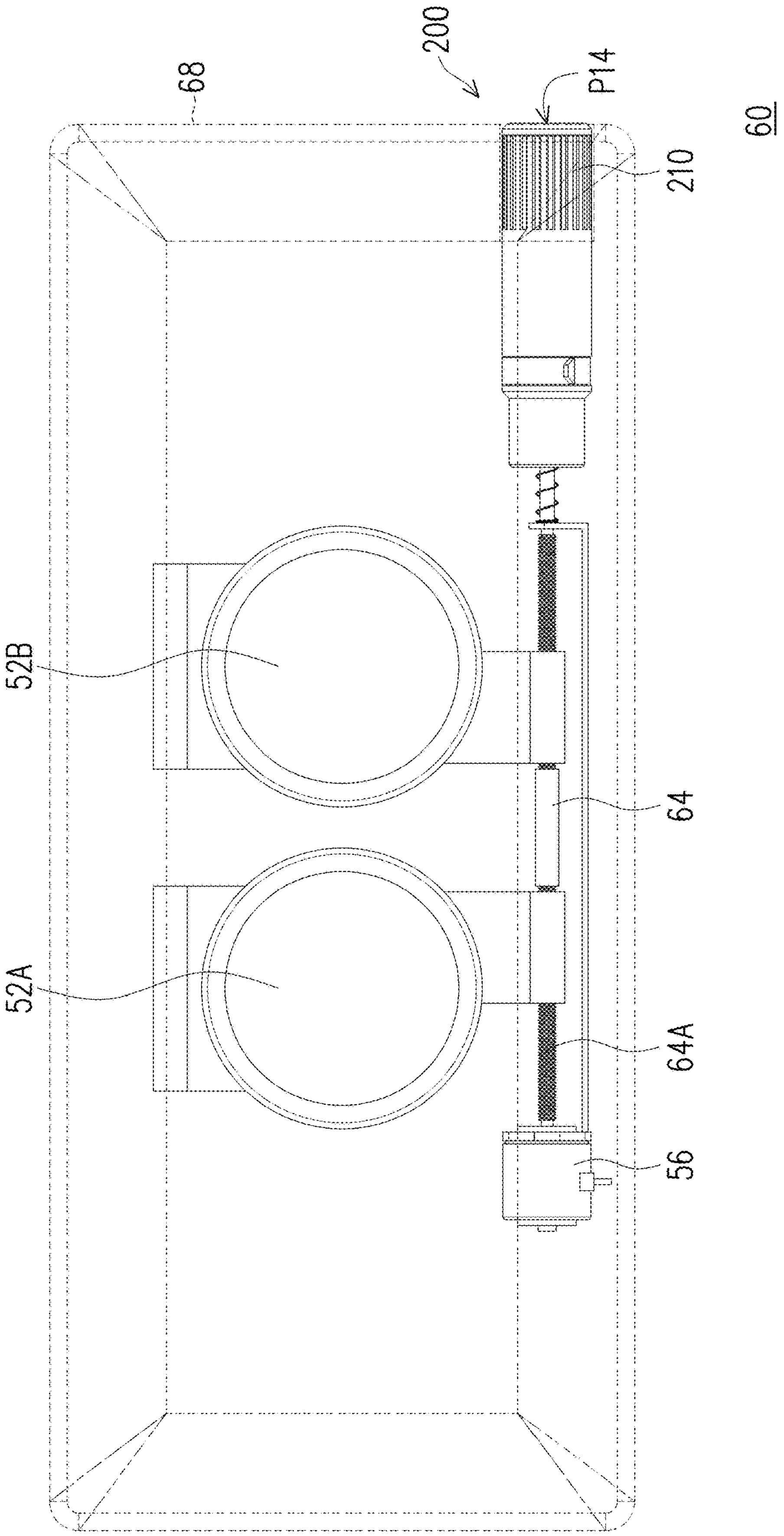
FIG. 9 is a schematic diagram of an electronic control mode of the head mounted display in FIG. 8.

FIG. 8 is a schematic diagram of a manual mode of a head mounted display according to a second embodiment of the invention. FIG. 9 is a schematic diagram of an electronic control mode of the head mounted display in FIG. 8. Referring to FIG. 8 and FIG. 9, a head mounted display 60 of this embodiment is similar to the head mounted display 50 of FIG. 1, and only the differences between the two are described in the following. The head mounted display 60 of this embodiment may further include a casing 68. Of course, the head mounted display 50 in FIG. 1 may further include a casing (not shown). The first display 52A, the second display 52B, a transmission component 64, and the electrically controlled driver 56 are disposed in the casing 68. In the manual mode of FIG. 8, a portion of the knob 210 protrudes outside the casing 68 to facilitate the user to rotate the knob 210. In the electronic control mode of FIG. 9, the knob 210 is located inside the casing 68, so that the user cannot turn the knob 210. Moreover, the user can visually and intuitively determine whether it is an electronically controlled mode, and will not mistakenly turn the knob 210, which improves the operability and experience of the user. The ability to incorporate the knob 210 into the casing 68 also provides greater design flexibility.

Figure 10:
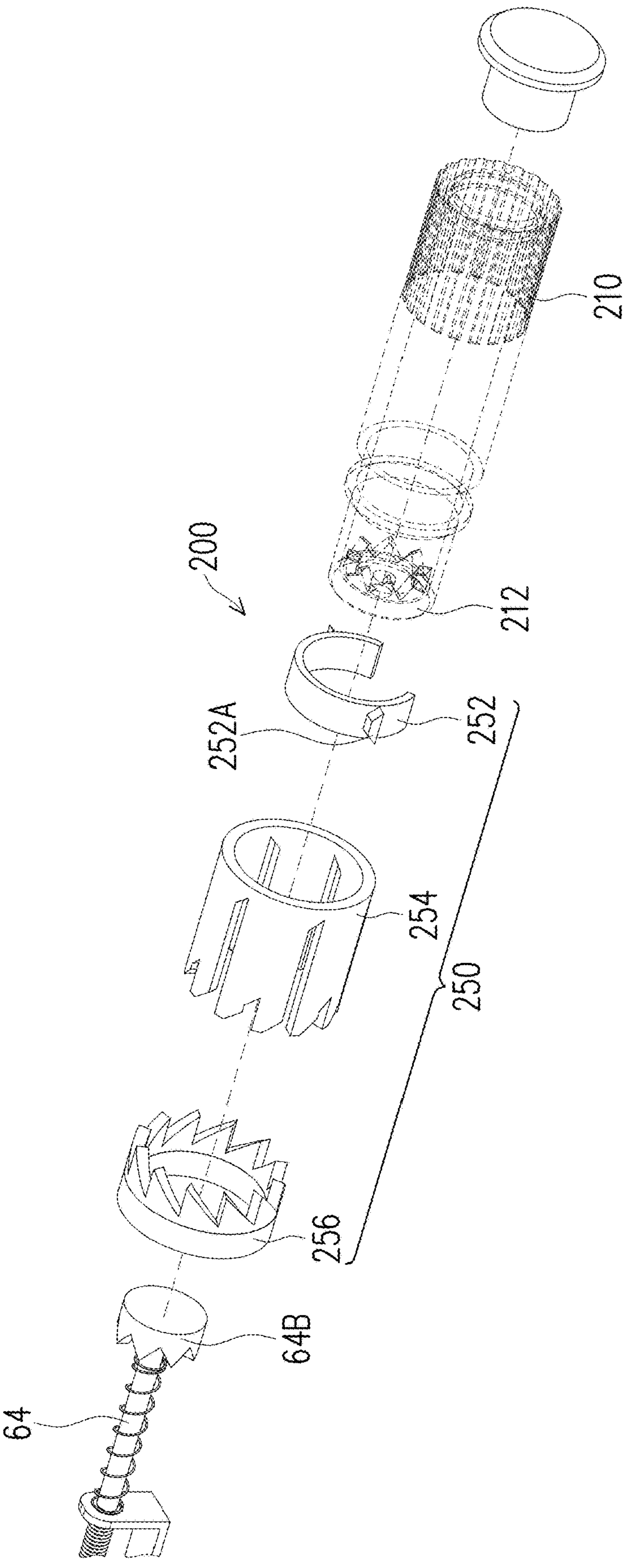
FIG. 10 is an exploded schematic diagram of a manual adjustment component and a transmission component of the head mounted display in FIG. 8.
Figure 11:
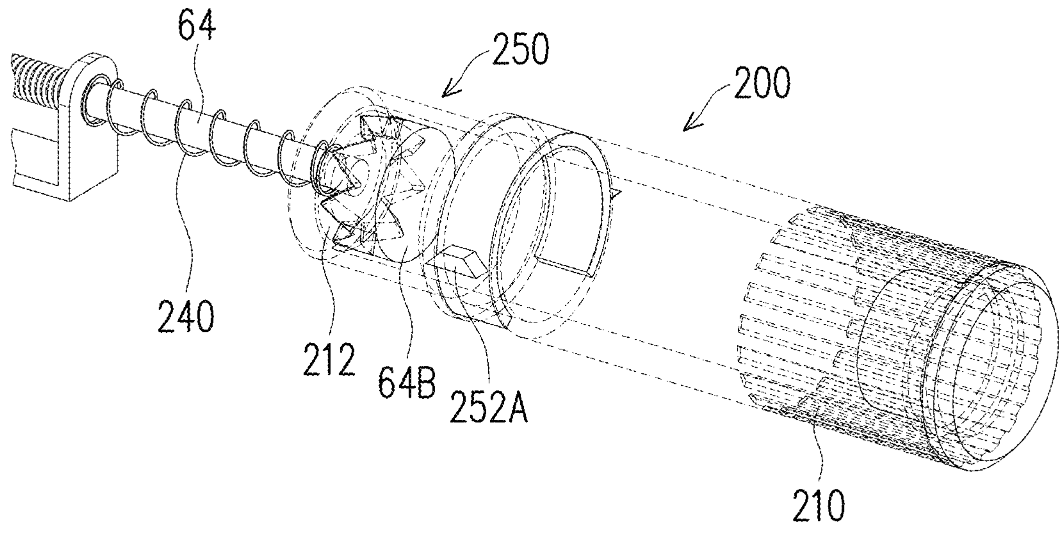
FIG. 11 is a perspective schematic diagram of the manual adjustment component and the transmission component of the head mounted display in FIG. 8 in the manual mode.
Figure 12:
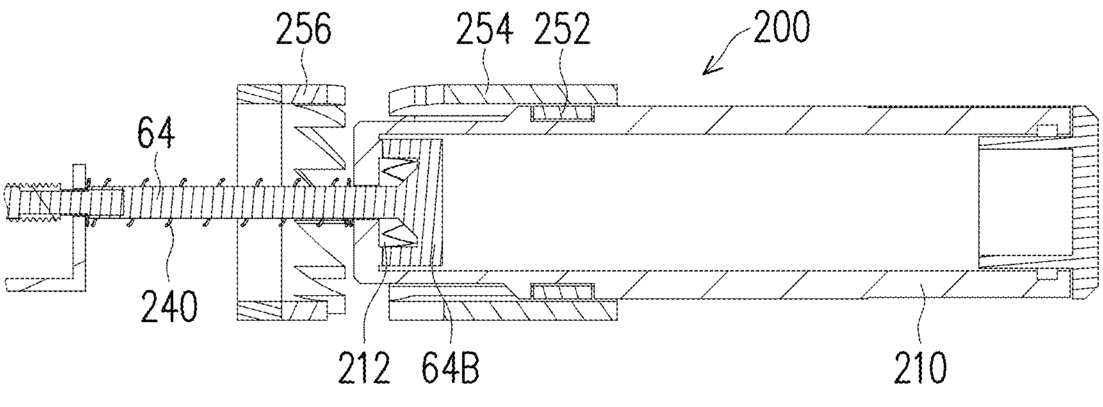
FIG. 12 is a schematic cross-sectional diagram of FIG. 11.

FIG. 10 is an exploded schematic diagram of a manual adjustment component and a transmission component of the head mounted display in FIG. 8. FIG. 11 is a perspective schematic diagram of the manual adjustment component and the transmission component of the head mounted display in FIG. 8 in the manual mode. FIG. 12 is a schematic cross-sectional diagram of FIG. 11. Referring to FIG. 10 to FIG. 12, a manual adjustment component 200 of this embodiment includes a knob 210, a dual push mechanism 250, and a reset component 240. The knob 210 is assembled to the dual push mechanism 250. In FIG. 8 and FIG. 9, the dual push mechanism 250 is omitted in order to clearly understand the position change of the knob 210. The knob 210 has a second coupling end 212. In the manual mode, the resilient restoring force of the reset component 240 keeps the knob 210 in a second position P12, which is the position where a portion of the knob 210 protrudes outside the casing 68 in FIG. 8. At this time, a first coupling end 64B is coupled to the second coupling end 212. Thus, the knob 210 may drive the transmission component 64 to rotate, and the transmission component 64 adjusts the distance between the first display 52A and the second display 52B.

Figure 13:
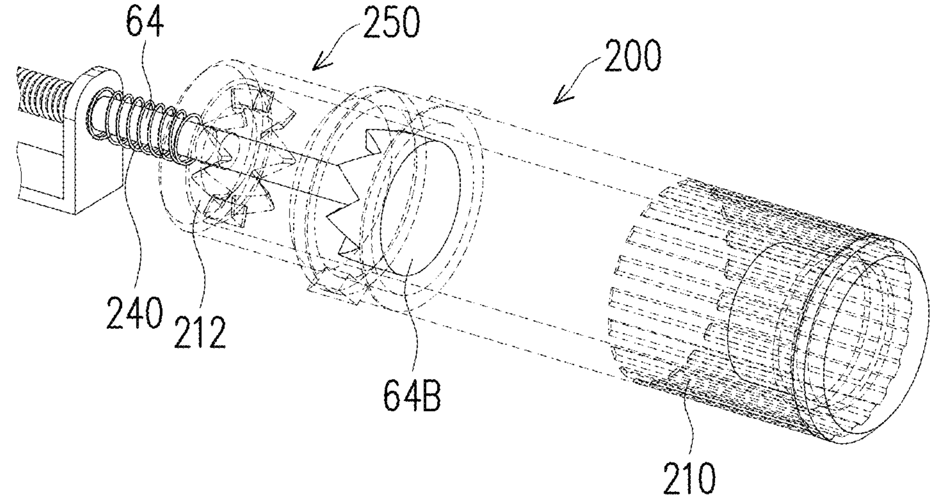
FIG. 13 is a perspective schematic diagram of the manual adjustment component and the transmission component of the head mounted display in FIG. 8 in the electronic control mode.
Figure 14:
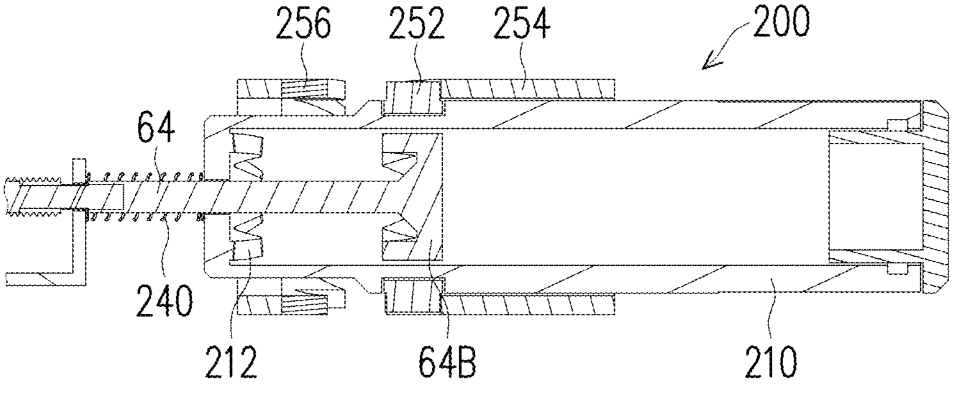
FIG. 14 is a schematic cross-sectional diagram of FIG. 13.

FIG. 13 is a perspective schematic diagram of the manual adjustment component and the transmission component of the head mounted display in FIG. 8 in the electronic control mode. FIG. 14 is a schematic cross-sectional diagram of FIG. 13. Referring to FIG. 10, FIG. 13, and FIG. 14, in the electronic control mode, the dual push mechanism 250 overcomes the resilient restoring force of the reset component 240 to keep the knob 210 in a first position P14, which is the position of the knob 210 inside the casing 68 in FIG. 9. At this time, the first coupling end 64B of the transmission component 64 is far away from the second coupling end 212. Thus, the knob 210 does not interfere with the transmission component 64, and the electrically controlled driver 56 may drive the transmission component 64 to adjust the distance between the first display 52A and the second display 52B.

The dual push mechanism 250 of this embodiment may be a common dual push mechanism. That is, when the knob 210 is not pressed, the dual push mechanism 250 keeps the knob 210 in the position where a portion of the knob 210 protrudes outside the casing 68. Pressing the knob 210 once, the dual push mechanism 250 keeps the knob 210 in the position inside the casing 68. Pressing the knob 210 once more, the dual push mechanism 250 releases the knob 210 and the resilient restoring force of the reset component 240 returns the knob 210 to the position where a portion of the knob 210 protrudes outside the casing 68. For example, the dual push mechanism 250 of this embodiment includes a first component 252, a second component 254, and a third component 256. The first component 252 is combined with the knob 210 so that they do not move relative to each other in the axis direction, but the first component 252 may rotate relative to the knob 210. The second component 254 has two guide slots that can cooperate with the first component 252 to allow the knob 210 to stay in the first position P14 or the second position P12. The third component 256 has a structure that cooperates with the first component 252 to allow the first component 252 to be rotated after contacting the third component 256 to allow a protrusion 252A on the first component 252 to enter another guide slot on the second component 254.

In this embodiment, the first coupling end 64B is restricted by the second coupling end 212 and remains within the knob 210, that is, the knob 210 does not completely disengage from the transmission component 64.

To sum up, in the head mounted display of this application, the separation of the manual adjustment component and the transmission component in the electronic control mode prevents the manual adjustment component from interfering with the effect of the electric control in adjusting the interpupillary distance, and maintains accuracy. In addition, when the user is not satisfied with the automatically adjusted interpupillary distance in the electronic control mode, the user can also use the manual adjustment component to fine-tune the interpupillary distance.

What is claimed is:

1. A head mounted display, comprising:

a first display;

a second display;

a transmission component, connecting the first display and the second display;

an electrically controlled driver, coupled to the transmission component, wherein the electrically controlled driver drives the transmission component in an electronic control mode to adjust a distance between the first display and the second display; and a manual adjustment component, detachably coupled to the transmission component, wherein the manual adjustment component is coupled to and drives the transmission component in a manual mode to adjust the distance between the first display and the second display, and the manual adjustment component is separated from the transmission component in the electronic control mode, wherein the transmission component has a fixed connection end and a first coupling end opposite to each other, the fixed connection end is fixedly connected to the electrically controlled driver, and the first coupling end is detachably coupled to the manual adjustment component.

2. The head mounted display according to claim 1, wherein the manual adjustment component comprises a knob, a guide ring, a sliding component, and a reset component, a driving section of the knob is pivoted in the guide ring, the driving section has a chute, the chute has a ramp section and a parallel section, a wall surface of the ramp section is not parallel to a rotation axis direction of the knob, a wall surface of the parallel section is parallel to the rotation axis direction, an inner surface of the guide ring has a plurality of guide slots, the sliding component has a pivot end and a second coupling end opposite to each other, the pivot end is pivoted in the driving section, and an outer surface of the sliding component has a guide rib, when a front section of the guide rib is slidably disposed in one of the guide slots, resilient restoring force of the reset component pushes against the sliding component, such that the front section contacts the wall surface of the ramp section, and the first coupling end is away from the second coupling end, when the knob rotates relative to the guide ring and the front section is located in one of the guide slots, the ramp section pushes the guide rib, and the guide ring restricts rotation of the sliding component, when the knob rotates relative to the guide ring and the guide rib is located outside the guide slots, the front section leaves the ramp section and contacts the wall surface of the parallel section, the first coupling end is coupled to the second coupling end, and the knob drives the transmission component to rotate through the sliding component, and the transmission component adjusts the distance between the first display and the second display.

3. The head mounted display according to claim 1, wherein the transmission component is screw-connected to the first display and the second display.

4. The head mounted display according to claim 1, wherein the electrically controlled driver is a motor.

5. The head mounted display according to claim 1, wherein the manual adjustment component comprises a knob, a dual push mechanism, and a reset component, the knob is assembled to the dual push mechanism, and the knob has a second coupling end, in the electronic control mode, the dual push mechanism overcomes resilient restoring force of the reset component to keep the knob in a first position, and the first coupling end is away from the second coupling end, in the manual mode, the resilient restoring force of the reset component keeps the knob in a second position, the first coupling end is coupled to the second coupling end, the knob drives the transmission component to rotate, and the transmission component adjusts the distance between the first display and the second display.

6. The head mounted display according to claim 5, wherein the first coupling end is restricted by the second coupling end and remains within the knob.

7. The head mounted display according to claim 5, further comprising a casing, wherein the first display, the second display, the transmission component, and the electrically controlled driver are disposed in the casing, the knob is located in the casing when kept in the first position, and the knob protrudes outside the casing when kept in the second position.

* * * * *